United States Patent
Reichman et al.

(10) Patent No.: US 7,494,581 B2
(45) Date of Patent: *Feb. 24, 2009

(54) PRODUCTION OF HYDROGEN FROM NON-CYCLIC ORGANIC SUBSTANCES HAVING MULTIPLE ALCOHOL FUNCTIONALITY

(75) Inventors: Benjamin Reichman, West Bloomfield, MI (US); William Mays, Commerce, MI (US); James Strebe, Clawson, MI (US)

(73) Assignee: Ovonic Battery Company, Inc., Rochester Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/232,272

(22) Filed: Sep. 21, 2005

(65) Prior Publication Data

US 2006/0018824 A1 Jan. 26, 2006

Related U.S. Application Data

(63) Continuation-in-part of application No. 10/763,616, filed on Jan. 23, 2004, and a continuation-in-part of application No. 10/636,093, filed on Aug. 7, 2003, now Pat. No. 6,994,839.

(51) Int. Cl.
*C01B 3/22* (2006.01)
*C25B 1/02* (2006.01)
(52) U.S. Cl. .................. 205/637; 423/419.1; 423/421; 423/422; 423/648.1
(58) Field of Classification Search .............. 423/648.1, 423/650, 419.1, 421, 422, 652; 205/637
See application file for complete search history.

(56) References Cited

U.S. PATENT DOCUMENTS

| | | | | |
|---|---|---|---|---|
| 4,676,972 | A * | 6/1987 | Velenyi et al. | 423/418.2 |
| 6,596,423 | B2 * | 7/2003 | Mahajan | 429/17 |
| 6,607,707 | B2 * | 8/2003 | Reichman et al. | 423/648.1 |
| 6,699,457 | B2 * | 3/2004 | Cortright et al. | 423/648.1 |
| 6,890,419 | B2 * | 5/2005 | Reichman et al. | 205/637 |
| 6,964,757 | B2 * | 11/2005 | Cortright et al. | 423/648.1 |
| 6,964,758 | B2 * | 11/2005 | Cortright et al. | 423/648.1 |
| 6,994,839 | B2 * | 2/2006 | Reichman et al. | 423/648.1 |
| 7,022,306 | B1 * | 4/2006 | Oroskar et al. | 423/648.1 |

* cited by examiner

*Primary Examiner*—Wayne Langel
(74) *Attorney, Agent, or Firm*—David W. Schumaker

(57) ABSTRACT

A method of producing hydrogen gas from a reaction of an organic substance having multiple alcohol functionality with a base. Hydrogen can be produced in a reaction of a base with an organic substance having multiple alcohol functionality that may proceed through the formation of a bicarbonate or carbonate compound as a byproduct. In some embodiments, the reaction may occur in the presence of water. The preferred organic substances include diols, triols, and higher order alcohols. Non-cyclic (linear or branched) organic substances having multiple alcohol functionality are among the preferred reactants. The instant base-facilitated hydrogen-producing reactions are thermodynamically more spontaneous than the corresponding conventional reformation reactions of the organic substances and can produce hydrogen at less extreme reaction conditions. The preferred reactants further include low volatility organic substances having multiple alcohol functionality. Such reactants permit the efficient formation of hydrogen in a liquid phase system and enable a continuous reaction capability in the liquid phase without the need to condense volatilized reactant.

21 Claims, 2 Drawing Sheets

PRODUCTION OF HYDROGEN FROM NON-CYCLIC ORGANIC SUBSTANCES HAVING MULTIPLE ALCOHOL FUNCTIONALITY

CROSS-REFERENCE TO RELATED APPLICATIONS

This application is a continuation-in-part of application Ser. No. 10/763,616, entitled "Base-Facilitated Reformation Reactions of Organic Substances", filed Jan. 23, 2004, and published as U.S. Pat. Appl. Pub. No. U.S. 2004/0156777 A1, and a continuation-in-part of application Ser. No. 10/636,093, entitled "Carbonate Recycling in a Hydrogen Producing Reaction", filed Aug. 7, 2003, now U.S. Pat. No. 6,994,839; the disclosures of which are herein incorporated by reference.

application Ser. No. 10/636,093 is a continuation-in-part of application Ser. No. 09/929,940, filed Aug. 15, 2001, now U.S. Pat. No. 6,607,707, and a continuation-in-part of application Ser. No. 10/321,935, filed Dec. 17, 2002, now U.S. Pat. No. 6,890,419.

FIELD OF INVENTION

This invention relates to processes for forming hydrogen gas from organic substances. More particularly, this invention relates to the production of hydrogen gas from low volatility alcohols. Most particularly, the instant invention relates to the production of hydrogen gas through reactions of organic substances having two or more alcohol groups per molecule in the presence of a base.

BACKGROUND OF THE INVENTION

Modern societies are critically dependent on energy derived from fossil fuels to maintain their standard of living. As more societies modernize and existing modern societies expand, the consumption of fossil fuels continues to increase and the growing dependence worldwide on the use of fossil fuels is leading to a number of problems. First, fossil fuels are a finite resource and concern is growing that fossil fuels will become fully depleted in the foreseeable future. Scarcity raises the possibility that escalating costs could destabilize economies as well as the likelihood that nations will go to war over the remaining reserves. Second, fossil fuels are highly polluting. The greater combustion of fossil fuels has prompted recognition of global warming and the dangers it poses to the stability of the earth's ecosystem. In addition to greenhouse gases, the combustion of fossil fuels produces soot and other pollutants that are injurious to humans and animals. In order to prevent the increasingly deleterious effects of fossil fuels, new energy sources are needed.

The desired attributes of a new fuel or energy source include low cost, plentiful supply, renewability, safety, and environmental compatibility. Hydrogen is currently a promising prospect for providing these attributes and offers the potential to greatly reduce our dependence on conventional fossil fuels. Hydrogen is the most ubiquitous element in the universe and, if its potential can be realized, offers an inexhaustible fuel source to meet the increasing energy demands of the world. Hydrogen is available from a variety of sources including natural gas, hydrocarbons in general, organic materials, inorganic hydrides and water. These sources are geographically well distributed around the world and accessible to most of the world's population without the need to import. In addition to being plentiful and widely available, hydrogen is also a clean fuel source. Combustion of hydrogen produces water as a by-product. Utilization of hydrogen as a fuel source thus avoids the unwanted generation of the carbon and nitrogen based greenhouse gases that are responsible for global warming as well as the unwanted production of soot and other carbon based pollutants in industrial manufacturing.

The realization of hydrogen as a ubiquitous source of energy ultimately depends on its economic feasibility. Economically viable methods for producing hydrogen as well as efficient means for storing, transferring, and consuming hydrogen, are needed. Chemical and electrochemical methods have been proposed for the production of hydrogen. The most readily available chemical feedstocks for hydrogen are organic compounds, primarily hydrocarbons and oxygenated hydrocarbons. Common methods for obtaining hydrogen from hydrocarbons and oxygenated hydrocarbons are dehydrogenation reactions and oxidation reactions.

Steam reformation and the electrochemical generation of hydrogen from water through electrolysis are two common strategies currently used for producing hydrogen. Both strategies, however, suffer from drawbacks that limit their practical application and/or cost effectiveness. Steam reformation reactions are endothermic at room temperature and generally require temperatures of several hundred degrees to achieve acceptable reaction rates. These temperatures are costly to provide, impose special requirements on the materials used to construct the reactors, and limit the range of applications. Steam reformation reactions also occur in the gas phase, which means that hydrogen must be recovered from a mixture of gases through a separation process that adds cost and complexity to the reformation process. Steam reformation also leads to the production of the undesirable greenhouse gases $CO_2$ and/or $CO$ as by-products. Water electrolysis has not been widely used in practice because high expenditures of electrical energy are required to effect water electrolysis. The water electrolysis reaction requires a high minimum voltage to initiate and an even higher voltage to achieve practical rates of hydrogen production. The high voltage leads to high electrical energy costs for the water electrolysis reaction and has inhibited its widespread use.

In U.S. Pat. No. 6,607,707 (the '707 patent), the disclosure of which is incorporated by reference herein, the instant inventors considered the production of hydrogen from hydrocarbons and oxygenated hydrocarbons through reactions of hydrocarbons and oxygenated hydrocarbons with a base. Using a thermodynamic analysis, the instant inventors determined that reactions of many hydrocarbons and oxygenated hydrocarbons react spontaneously with a base or basic aqueous solution to form hydrogen gas at particular reaction conditions, while the same hydrocarbons and oxygenated hydrocarbons react non-spontaneously in conventional steam reformation processes at the same reaction conditions. Inclusion of a base was thus shown to facilitate the formation of hydrogen from many hydrocarbons and oxygenated hydrocarbons and enabled the production of hydrogen at less extreme conditions than those normally encountered in steam reformation reactions, thereby improving the cost effectiveness of producing hydrogen gas. In many reactions, the processes of the '707 patent led to the formation of hydrogen gas from a liquid phase reaction mixture, in some cases at room temperature, where hydrogen was the only gaseous product and thus was readily recoverable without the need for a gas phase separation step. The reactions of the '707 patent further operate through the formation of carbonate ion or bicarbonate ion and avoid the production of the greenhouse gases $CO$ and $CO_2$. Inclusion of a base creates a new reaction pathway for the formation of hydrogen gas with thermodynamic benefits that allow for the production of hydrogen gas at lower temperatures than are needed for corresponding steam reformation processes.

In U.S. Pat. No. 6,890,419 (the '419 patent), the disclosure of which is incorporated by reference herein, the instant inventors considered electrochemical methods to promote the production of hydrogen from organic substances in the presence of water (or acidic solution) and/or a base. They showed that electrochemical reactions of organic substances with water to produce hydrogen require lower electrochemical cell voltages than water electrolysis. They also showed that electrochemical reactions of organic substances in the presence of an acid or base require low electrochemical cell voltages at room temperature.

In co-pending U.S. patent application Ser. No. 10/636,093 (the '093 application), published as U.S. Pat. Appl. Pub. No. 2004/0028603, the disclosure of which is incorporated by reference herein, the instant inventors recognized that the realization of the beneficial properties of the reactions described in the '707 patent and the '419 patent requires a system level consideration of the costs and overall efficiency of the reactions. In addition to energy inputs and raw materials, consideration of the disposal or utilization of by-products must be made. Of particular importance is consideration of the dispensation of the carbonate and bicarbonate ion products of the disclosed hydrogen producing reactions. In the co-pending '093 application, the instant inventors describe strategies for the recycling of the carbonate and bicarbonate ions. A carbonate recycle process was described that includes a first step in which carbonate ion is reacted with a metal hydroxide to form a soluble metal hydroxide and a weakly soluble or insoluble carbonate salt. The soluble metal hydroxide may be returned to the hydrogen producing reaction as a base reactant for further production of hydrogen. In a second step, the carbonate salt is thermally decomposed to produce a metal oxide and carbon dioxide. In a third step, the metal oxide is reacted with water to reform the metal hydroxide used in the first step. The carbonate recycle process is thus sustainable with respect to the metal hydroxide and the overall hydrogen producing process is sustainable with respect to the base through the carbonate recycling process of the '093 application. Bicarbonate by-products of hydrogen producing reactions of organic substances with bases can be similarly recycled according to the '093 application by first converting a bicarbonate by-product to a carbonate and then recycling the carbonate.

In co-pending U.S. patent application Ser. No. 10/763,616 (the '616 application), published as U.S. Pat. Appl. Pub. No. 2004/0156777, and co-pending U.S. patent application Ser. No. 10/966,001 (the '001 application), the disclosures of which are incorporated by reference herein, the instant inventors described an extension of the base-facilitated production of hydrogen from organic substances to a wider range of starting materials. Of particular importance in the '616 application was the production of hydrogen from petroleum-related or petroleum-derived starting materials such as long chain hydrocarbons; fuels such as gasoline, kerosene, diesel, petroleum distillates and components thereof; and mixtures of organic substances. The '001 application considered the production of hydrogen from biomass and naturally occurring organic matter. In U.S. patent application Ser. No. 10/984,202, the disclosure of which is incorporated by reference herein, the instant inventors further considered the production of hydrogen from carbonaceous matter such as coal using a base-facilitated reaction.

The hydrogen producing reactions of the above mentioned patents and applications provide for an efficient, environmentally friendly method for generating the hydrogen needed for the advancement of a hydrogen based economy. There is a need to further extend the range of applicability of the family of base-facilitated hydrogen producing reactions. Of particular interest is consideration of the range of starting materials that may be used in the reactions and the identification of starting materials that are conveniently adapted to continuous reaction processes.

SUMMARY OF THE INVENTION

The instant invention provides a process for producing hydrogen gas from chemical or electrochemical reactions of low volatility organic substances with bases. The preferred low volatility organic substances are substances having two or more alcohol groups per molecule, including diols, triols and higher alcohols. Specific embodiments include ethylene glycol and glyercol.

The instant process includes the step of reacting an organic substance having multiple alcohol functionality with a base to produce hydrogen. The reaction may occur chemically or electrochemically. The instant base-facilitated hydrogen-producing reactions improve the thermodynamic spontaneity of producing hydrogen gas from organic substances having multiple alcohol functionality relative to the production of hydrogen gas through the corresponding conventional reformation process. In one embodiment, the greater thermodynamic spontaneity permits the production of hydrogen gas through the instant base-facilitated reactions of an organic substance having multiple alcohol functionality at temperatures that are lower than those needed to produce hydrogen gas from the organic substance in a conventional reformation reaction. In another embodiment, the greater thermodynamic spontaneity permits the production of hydrogen gas from an organic substance having multiple alcohol functionality at a faster rate at a particular temperature in a base-facilitated reaction than in a conventional reformation reaction of the organic substance at the particular temperature.

In one embodiment, an organic substance having multiple alcohol functionality reacts with a base to produce a carbonate or bicarbonate compound as a by-product. In another embodiment, an organic substance having multiple alcohol functionality reacts with a base to produce a salt, precipitated or dissolved, of an oxidized form of the organic substance.

In one embodiment, the instant base-facilitated hydrogen production reactions are completed in a solution or liquid phase using a low volatility organic substance having multiple alcohol functionality. In this embodiment, the rate of reaction of the organic substance in the liquid phase below its boiling point is sufficiently great to permit the efficient production of hydrogen without significant losses of feedstock due to volatilization. The need to condense vapors of the feedstock is thus eliminated and as a result, continuous operation of the reaction is better enabled.

DETAILED DESCRIPTION OF THE ILLUSTRATED EMBODIMENTS

Figure 1:
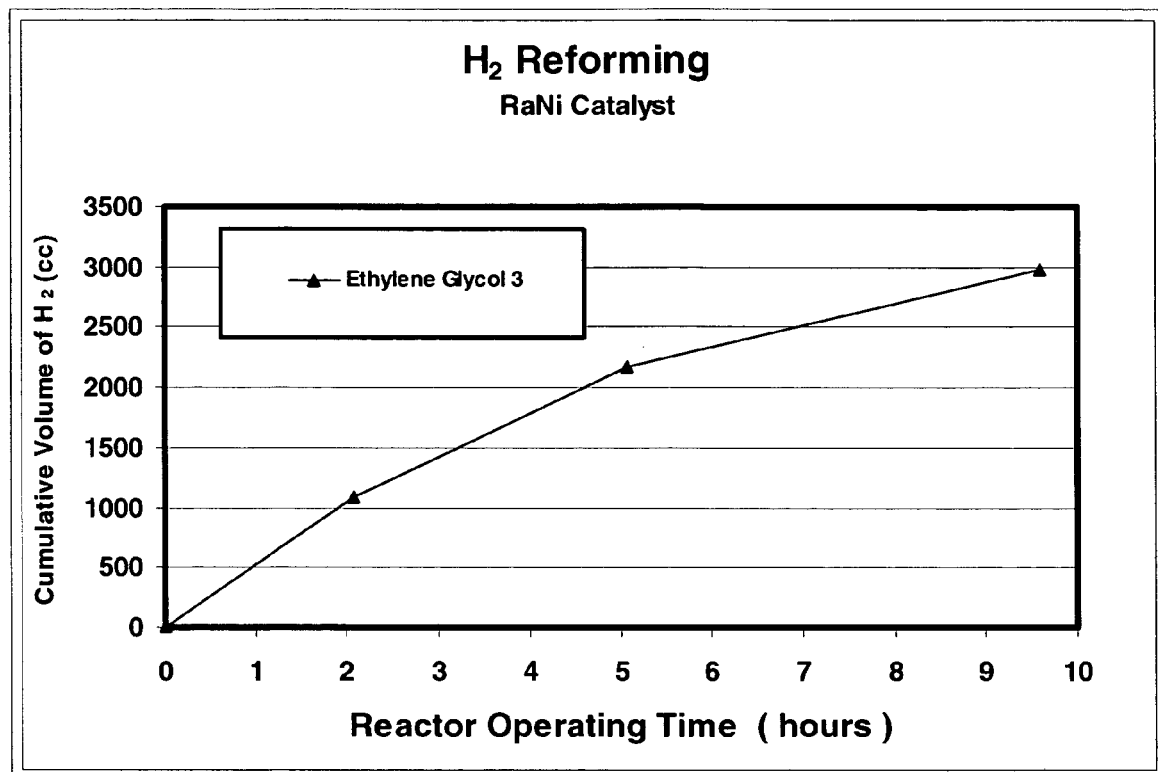
FIG. 1. Cumulative volume ($cm^3$) of hydrogen gas produced from a reaction of ethylene glycol with a base as a function of the time of reaction.

The instant invention is concerned with chemical and electrochemical hydrogen-producing reactions similar to those described in U.S. Pat. No. 6,607,707 (the '707 patent), U.S. Pat. No. 6,890,419 (the '419 patent), U.S. patent application Ser. No. 10/763,616 (the '616 application) and U.S. patent application Ser. No. 10/966,001 (the '001 application), the disclosures of which are incorporated by reference herein. The instant invention in particular provides for the production of hydrogen from organic substances having multiple alcohol functionality and mixtures thereof.

In one embodiment, hydrogen is produced from a low volatility organic substance having multiple alcohol functionality in a base-facilitated reaction that proceeds through the formation of a carbonate or bicarbonate by-product compound. The carbonate or bicarbonate by-product may include the carbonate or bicarbonate ion as a product in liquid phase solution or may include a carbonate or bicarbonate salt in the solid phase.

In another embodiment, hydrogen is produced from a low volatility organic substance having multiple alcohol functionality in a base-facilitated reaction that proceeds through the formation of a salt of an oxidized form of the organic substance as a by-product such as the salt of an organic acid. The organic salt by-product may remain soluble in a liquid phase or may precipitate.

In the instant invention, an organic substance having multiple alcohol functionality is utilized as a feedstock or starting material in a base-facilitated hydrogen-producing reaction. As discussed in the '707 patent, the '419 patent, '616 application, and '001 application, reactions of organic substances with a base under certain conditions may permit the production of hydrogen gas through the formation of carbonate ion and/or bicarbonate by-products. Inclusion of a base as a reactant in the production of hydrogen from organic substances thus provides an alternative reaction pathway relative to conventional reformation reactions of organic substances, which proceed through a reaction pathway that leads to the production of $CO_2$ from a reaction of an organic substance with water.

The alternative reaction pathway of the instant base-facilitated reformation reactions of organic substances leads to a more spontaneous (or less non-spontaneous) reaction at a particular set of reaction conditions relative to a conventional reformation reaction of the same organic matter. For illustration purposes, a comparative example involving an oxygenated hydrocarbon from the '707 patent may be considered. The production of hydrogen from ethanol may occur through the following reactions (1), (2) or (3) in the standard state liquid phase:

|   | | $\Delta G^0_{rxn}$ (cal/mol) |
|---|---|---|
| (1) | $C_2H_5OH_{(l)} + 3H_2O_{(l)} \leftrightarrows 6H_{2(g)} + 2CO_{2(g)}$ | 23,950 |
| (2) | $C_2H_5OH_{(l)} + 2OH^-_{(aq)} + 3H_2O_{(l)} \leftrightarrows 6H_{2(g)} + 2HCO_3^-_{(aq)}$ | 7,040 |
| (3) | $C_2H_5OH_{(l)} + 4OH^-_{(aq)} + H_2O_{(l)} \leftrightarrows 6H_{2(g)} + 2CO_3^{2-}_{(aq)}$ | −2,970 |

Reaction (1) is the conventional reformation reaction of ethanol and reactions (2) and (3) are base-facilitated reformation reactions according to the invention of the '707 patent. In reactions (2) and (3), the hydroxide ion ($OH^-$) reactant is provided by a base. Reactions (2) and (3) differ with respect to the relative amounts of hydroxide ion and ethanol. Reaction (2) includes a lower amount of base and proceeds through a bicarbonate ion ($HCO_3^-$) by-product, while reaction (3) includes a higher amount of base and proceeds through a carbonate ion ($CO_3^{2-}$) by-product.

$\Delta G^0_{rxn}$ is the Gibbs free energy of reaction for each of the reactions at standard conditions (25° C., 1 atm. and unit activity of reactants and products). The Gibbs free energy is an indicator of the thermodynamic spontaneity of a chemical reaction. Spontaneous reactions have negative values for the Gibbs free energy, while non-spontaneous reactions have positive values for the Gibbs free energy. Reaction conditions such as reaction temperature, reaction pressure, concentration etc. may influence the value of the Gibbs free energy. A reaction that is non-spontaneous at one set of conditions may become spontaneous at another set of conditions. The magnitude of the Gibbs free energy is an indicator of the degree of spontaneity of a reaction. The more negative (or less positive) the Gibbs free energy is, the more spontaneous is the reaction.

The reformation reaction (1) above is a non-spontaneous reaction at standard conditions. The base-facilitated reformation reaction (2) is also non-spontaneous, but is more spontaneous than reaction (1) (and would most likely become spontaneous at a lower temperature than reaction (1)). Inclusion of a base creates a reaction pathway for the production of hydrogen from ethanol in a base-facilitated reaction that is less non-spontaneous than the production of hydrogen from the conventional reformation reaction (1) of ethanol. Further addition of base leads to a further decrease in the Gibbs free energy and ultimately provides a spontaneous reaction at standard conditions as exemplified by reaction (3) above. The ability of a base to improve the thermodynamic spontaneity of the production of hydrogen from organic substances is an important beneficial feature of the instant hydrogen producing reactions. The greater thermodynamic spontaneity may enable the spontaneous production of hydrogen from an organic substance at a particular set of reaction conditions in a base-facilitated reformation reaction where the conventional reformation reaction at the same conditions is non-spontaneous and therefore unable to produce hydrogen spontaneously.

The instant invention generally is concerned with the production of hydrogen from organic substances in a base-facilitated reformation reaction. More specifically, the instant invention demonstrates the feasibility of using a base to improve the thermodynamic spontaneity of producing hydrogen from selected organic substances. Of particular interest to the instant inventors is the production of hydrogen from organic substances having multiple alcohol functionality. Non-cyclic organic substances having multiple alcohol functionality are the preferred reactants in the instant base-facilitated hydrogen production reactions. Representative preferred embodiments include linear or branched diols, triols and higher order alcohols.

Hydrogen can be obtained from the preferred organic substances through a reformation reaction analogous to reaction (1) above. As an example, hydrogen can be produced from ethylene glycol ($C_2H_6O_2$), a diol in which each molecule includes two alcohol groups, in the following reaction (4):

$$C_2H_6O_{2(l)} + 2H_2O_{(l)} \leftrightarrows 2CO_{2(g)} + 5H_{2(g)} \qquad (4)$$

A thermodynamic analysis of this reaction indicates that at standard conditions, $\Delta G^0_{rxn}$=2.0 kcal/mol and $\Delta H^0_{rxn}$=57.4 kcal/mol, where $\Delta G^0_{rxn}$ is the Gibbs free energy of reaction and $\Delta H^0_{rxn}$ is the enthalpy of reaction. The analysis indicates that the reaction is slightly non-spontaneous at standard conditions. The reaction is also highly endothermic at standard conditions and thus requires a substantial input of energy to perform. In practice, the reformation of ethylene glycol according to reaction (4) would require high temperatures to proceed at a reasonable rate.

The thermodynamic analysis of reaction (4) is representative of reformation reactions of organic substances and is analogous to the reactions used in the reformation of simple compounds such as methanol or ethanol (reaction (1)). In practice, the need to operate at high temperature to achieve acceptable reaction rates means that high volatility compounds such as methanol and ethanol vaporize and react in the vapor phase in a conventional reformation reaction such as reaction (1).

In many applications, vapor phase reactions are undesirable because the reaction systems require large volumes. When compactness is required in an application, liquid phase reactions are desirable since liquid phase reactions typically can be performed in smaller reaction systems. With the growing interest in using hydrogen as a fuel source, it is desirable to develop reactions and systems for producing hydrogen in the liquid phase. Liquid phase reactions can be completed, for example, in compact reactors (e.g. on-board reactors) or in miniature or micro-sized fuel cells to provide a compact or portable hydrogen fuel generating system for consumer applications.

Volatile substances (e.g. methanol or ethanol) are difficult to react in the liquid phase because of their tendency to vaporize. To maintain a liquid phase reaction, it is necessary to include units for condensing volatilized reactants (starting materials, fuels) to prevent loss of material. The condensing units need to condense vapors to the liquid phase and return the liquefied reactants back to the reaction vessel to efficiently produce hydrogen from a volatile starting material in a liquid phase reaction. The need for condensers increases the cost, volume and weight of the reaction system and this defeats the objective of completing a hydrogen-producing reaction in a compact reaction system.

Low volatility organic substances are more amenable to liquid phase reactions and may serve as more effective reactants, starting materials or fuels in a hydrogen-producing liquid phase reaction. Low volatility reactants are more easily retained in the liquid phase and may obviate the need for condensing units, thus promoting the objective of producing hydrogen in a compact reaction system in a continuous fashion. In order to accomplish production of hydrogen from low volatility organic substances in the liquid phase, it is necessary to identify sufficiently reactive substances and sufficiently facile reactions at temperatures that do not lead to thermal decomposition of the reactants.

The more favorable thermodynamic characteristics of the instant reactions permit the formation of hydrogen from low volatility organic substances at appreciable rates in a liquid phase system and also reduce the temperature required for practical operation. Under the principles of the instant invention, hydrogen is produced from organic substances having multiple alcohol functionality. Multiple alcohol functionality is present when an organic substance includes two or more alcohol groups per molecule. Alcohol groups are polar and tend to exhibit some degree of hydrogen bonding as well as electrostatic or van der Waals interactions and these properties tend to increase the strength of intermolecular interactions between molecules. By including two or more alcohol groups per molecule, the strength of intermolecular interactions increases and this increase tends to lead to a reduction in the volatility of the substance, thereby making the substance better suited for a liquid phase reaction.

In the instant invention, an organic substance having multiple alcohol functionality is reacted with a base such as sodium hydroxide (NaOH). Depending on the relative proportion of base employed, in one embodiment, hydrogen can be produced from an organic substance having multiple alcohol functionality through reactions that produce carbonate or bicarbonate salt of the cation present in the base.

Representative reactions of ethylene glycol with sodium hydroxide that proceed through the formation of sodium carbonate ($Na_2CO_3$) and sodium bicarbonate ($NaHCO_3$) are given in reactions (5) and (6), respectively, below:

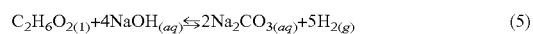

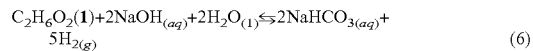

A thermodynamic analysis of reaction (5) indicates that at standard conditions $\Delta G^0_{rxn} = -24.7$ kcal/mol and $\Delta H^0_{rxn} = 4.06$ kcal/mol. The analysis shows that the inclusion of a base in the hydrogen producing reaction leads to a decrease in both the free energy and enthalpy of reaction at standard conditions relative to the reformation reaction (4) of ethylene glycol. The base-facilitated hydrogen producing reaction (5) is spontaneous at standard conditions, rather than non-spontaneous as is the case for reformation reaction (4). Reaction (5) is also significantly less endothermic than reaction (4). As a result, the base-facilitated reaction (5) can occur in principle at much milder conditions in the liquid phase than the conventional reformation reaction (4) of ethylene glycol.

A thermodynamic analysis of reaction (6) indicates that at standard conditions $\Delta G^0_{rxn} = -15.3$ kcal/mol and $\Delta H^0_{rxn} = 23.7$ kcal/mol. The analysis shows that the inclusion of a base in the hydrogen producing reaction leads to a decrease in both the free energy and enthalpy of reaction at standard conditions relative to the reformation reaction (4). The base-facilitated hydrogen producing reaction (6) is more spontaneous than the reformation reaction (4), but less spontaneous than the base-facilitated reaction (5). The base-facilitated reaction (6) remains endothermic, but is less endothermic than the reformation reaction (4). Since the base-facilitated reaction (6) is less endothermic than the reformation reaction (4), a smaller input of energy is needed for the operation of reaction (6) than reaction (4). As a result, the temperature required to operate reaction (6) at practical rates in the liquid phase is expected to be much lower than the temperatures required for the performance of the reformation reaction (4). The base-facilitated reaction (6) thus offers a cost advantage over the reformation reaction (4) since less extreme conditions suffice to produce hydrogen at a reasonable rate from reaction (6).

As an example of the production of hydrogen from another organic substance with multiple alcohol functionality, we consider glycerol as a starting material in the instant base-facilitated reactions. Glycerol is a triol having the formula $C_3H_8O_3$ and includes three alcohol groups per molecule. Hydrogen can be produced from glycerol in a reformation reaction as shown in the following reaction (7):

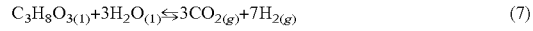

A thermodynamic analysis of this reaction indicates that at standard conditions, $\Delta G^0_{rxn} = 1.15$ kcal/mol and $\Delta H^0_{rxn} = 82.7$ kcal/mol, where $\Delta G^0_{rxn}$ is the Gibbs free energy of reaction and $\Delta H^0_{rxn}$ is the enthalpy of reaction. The analysis indicates that the reaction is non-spontaneous at standard conditions and is highly endothermic. The reaction thus requires a substantial input of energy to perform. The high energy input required for the reformation of glycerol according to reaction (7) would require high operating temperatures to proceed at a reasonable rate would likely be impractical due to thermal decomposition of glycerol.

Under the principles of the instant invention, hydrogen is produced from glycerol by reacting it with a base such as sodium hydroxide (NaOH). Depending on the relative proportion of base employed, in one embodiment, hydrogen can be produced from glycerol reactions that produce carbonate or bicarbonate salt of the cation present in the base. Representative reactions of glycerol with sodium hydroxide that proceed through the formation of sodium carbonate ($Na_2CO_3$) and sodium bicarbonate ($NaHCO_3$) are given in reactions (8) and (9), respectively, below:

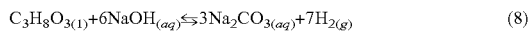

(8)

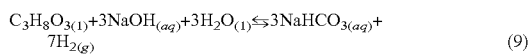

(9)

A thermodynamic analysis of reaction (8) indicates that at standard conditions $\Delta G^0_{rxn}=-38.9$ kcal/mol and $\Delta H^0_{rxn}=2.6$ kcal/mol. The analysis shows that the inclusion of a base in the hydrogen producing reaction leads to a decrease in both the free energy and enthalpy of reaction at standard conditions relative to the reformation reaction (7). The base-facilitated hydrogen producing reaction (8) is spontaneous at standard conditions and has become much less endothermic than the reformation reaction (7). As a result, the base-facilitated reaction (8) can occur at standard conditions at much more favorable conditions in the liquid phase than the conventional reformation reaction (7).

A thermodynamic analysis of reaction (9) indicates that at standard conditions $\Delta G^0_{rxn}=-23.72$ kcal/mol and $\Delta H^0_{rxn}=32.2$ kcal/mol. The analysis shows that the inclusion of a base in the hydrogen producing reaction leads to a decrease in both the free energy and enthalpy of reaction at standard conditions relative to the reformation reaction (7). The base-facilitated hydrogen producing reaction (9) is more spontaneous than the reformation reaction (7), but less spontaneous than the base-facilitated reaction (8). The base-facilitated reaction (9) remains endothermic, but is less endothermic than the reformation reaction (7). Since the base-facilitated reaction (9) is less endothermic than the reformation reaction (7), a smaller input of energy is needed for reaction (9) than reaction (7). As a result, the temperature required to operate reaction (9) in a practical reactor is expected to be lower than the several hundred degree temperatures that would normally be necessary for the practical performance of the reformation reaction (7). The base-facilitated reaction (9) thus offers a cost advantage over the reformation reaction (7) since less extreme conditions suffice to produce hydrogen at a reasonable rate from reaction (9).

The illustrative embodiments of the instant base-facilitated reactions described hereinabove are representative of reactions according to the instant invention that proceed through a liquid phase form of the base. The instant invention further includes embodiments in which a solid or molten phase base is utilized in the instant reaction and those in which a solid or molten phase carbonate or bicarbonate by-product is produced along with hydrogen gas. A solid phase base (e.g. solid phase or crystalline sodium hydroxide), for example, may be contacted with a liquid phase organic substance having multiple alcohol functionality to effect a reaction that produces hydrogen gas. A representative example of such a reaction is given below:

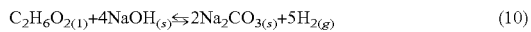

(10)

In this reaction, ethylene glycol is reacted with solid phase sodium hydroxide to produce solid phase sodium carbonate and hydrogen. The reaction occurs upon contacting solid phase sodium hydroxide with liquid phase ethylene glycol. The reaction proceeds from solid phase sodium hydroxide without a need to dissolve the sodium hydroxide in ethylene glycol. In actual practice, the reaction may occur through a combination of soluble and insoluble sodium hydroxide. A thermodynamic analysis of reaction (10) indicates that at standard conditions $\Delta G^0_{rxn}=-59.3$ kcal/mol and $\Delta H^0_{rxn}=-24.9$ kcal/mol. Reaction (10) is both spontaneous and exothermic at standard conditions and is thus a highly favored reaction. A similar reaction occurs upon reaction of vapor phase ethylene glycol with solid phase sodium hydroxide to produce solid phase sodium carbonate and hydrogen. In reactions that further include water as a reactant, the water may be in the form of water vapor, liquid water or ice. The instant invention further includes as starting materials mixtures of organic substances in which at least one component of the mixture is an organic substance having multiple alcohol functionality.

The instant inventors note that the actual ratio of base to the organic starting material is not constrained by the stoichiometric ratios indicated in the representative reactions presented hereinabove. The production of hydrogen according to the instant invention occurs for arbitrary ratios of base and/or water to the organic starting material and may occur through a combination of different reactions under a given set of reaction conditions and reactant amounts. Hydrogen gas can be produced via the instant invention along with the production of a carbonate by-product, bicarbonate by-product or a combination of a carbonate and bicarbonate by-product.

The instant invention generally includes reactions of organic substances having multiple alcohol functionality with a base to form hydrogen gas. Preferred organic substances include non-cyclic organic substances having multiple alcohol functionality (e.g. ethylene glycol, glycerol) and extend to diols, triols, and higher order alcohols as well as non-cyclic organic substances that are linear or branched. As described hereinabove, in one embodiment, carbonate and/or bicarbonate compounds are produced as byproducts.

The instant invention further includes hydrogen-producing reactions of the instant organic substances having multiple alcohol functionality with bases that produce other byproducts, such as alkoxides of the organic substances as in the following illustrative reactions (11) and (12) of ethylene glycol and glycerol, respectively,

(11)

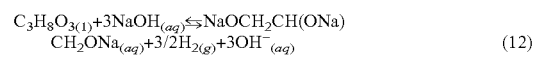

(12)

or salts of oxidized forms of the organic substances (e.g. salts of the carboxylic acid or aldehyde forms of the organic substance) as in the following reaction of ethylene glycol with sodium hydroxide:

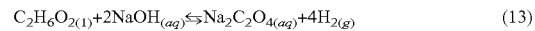

(13)

where the product $Na_2C_2O_4$ is the disodium salt of oxalic acid. A thermodynamic analysis of reaction (13) indicates that at standard conditions $\Delta G^0_{rxn}=-8.7$ kcal/mol and $\Delta H^0_{rxn}=21.1$ kcal/mol so that the reaction is spontaneous and slightly endothermic at standard conditions. In reaction (13), both alcohol groups have been converted to the deprotonated form of the corresponding organic acid group. Similar reactions produce hydrogen from other organic substances having multiple alcohol functionality. In reactions of this type, one or more alcohol groups of an organic substance are oxidized to an aldehyde or acid form. Depending on reaction conditions, the reaction byproduct may be a carbonate, bicarbonate, alkoxide, salt of an aldehyde or carboxylic acid, or any combination thereof.

EXAMPLE 1

In this example, the production of hydrogen gas from a reaction of ethylene glycol and sodium hydroxide is demonstrated. A stainless steel reactor having a volume of ~75 mL and equipped with pressure transducer was used in this experiment. Sodium hydroxide (15 g) and ethylene glycol (26 mL (28.6 gram)) were placed in the reactor. The relative amounts of sodium hydroxide and ethylene glycol are such that sodium hydroxide is the limiting reactant. Water (2 mL) and Raney nickel catalyst (3.5 g) were also added. The reactor was purged by filling the headspace of the reactor with helium and evacuating and repeating for a total of five cycles. The reactor was then filled with helium to a pressure of 1 atm and sealed for the experiment.

In this experiment, the reactor was heated to several different temperatures and at each temperature, the rate of increase of the pressure was measured. Temperatures between 50° C. and 110° C. were used. The results are summarized below:

| Temperature (° C.) | Rate of Pressure Increase (psi/hr) |
|---|---|
| 50 | 4 |
| 60 | 22 |
| 70 | 55 |
| 80 | 130 |
| 90 | 340 |
| 100 | 750 |
| 110 | 1200 |

The gas produced by the reaction was collected and analyzed using gas chromatography. The gas was determined to consist of essentially pure hydrogen.

This example shows that hydrogen gas can be produced from a reaction of ethylene glycol and sodium hydroxide, that the reaction requires a temperature of no greater than 50° C. to occur and that hydrogen gas is the primary gas phase product of the reaction.

EXAMPLE 2

In this example, hydrogen is produced from a reaction of ethylene glycol and sodium hydroxide in a constant temperature reaction. The reactor described in EXAMPLE 1 hereinabove was used in this experiment. Sodium hydroxide (7.5 g), ethylene glycol (14 g), and Raney nickel catalyst (1.75 g) were placed in the reactor. As in EXAMPLE 1, sodium hydroxide was the limiting reactant. The reactor was flushed by filling and evacuating with helium five times as described in EXAMPLE 1 and was charged to a pressure of 1 atm with helium and sealed for the experiment. The reactor was heated to 110° C. and the pressure in the reactor was measured as a function of time. As demonstrated in EXAMPLE 1, hydrogen gas is the primary gas product of the reaction. The rate and amount of hydrogen gas produced by the reaction were measured as a function of the time of reaction. Some of the results are summarized in FIG. 1, where the accumulated volume of hydrogen gas is reported in units of standard $cm^3$. The rate of hydrogen production was ~800 $cm^3$/hr at the outset of the reaction and decreased as the reaction progressed as the reactants were consumed. At the time the reaction was stopped, it was estimated that the reaction had proceeded to ~50% completion. Approximately 3000 $cm^3$ of hydrogen gas had been produced at this time.

This example shows that hydrogen can be produced from a reaction of sodium hydroxide and ethylene glycol in the absence of water.

EXAMPLE 3

In this example, the rate of production of hydrogen gas formed from a reaction of sodium hydroxide with ethylene glycol was measured at 110° C. in an open system reactor and an analysis of the solid phase product was performed. The reactor, reactants (including amounts), and conditions described in EXAMPLE 2 were used in this experiment, with the exception that the reactor was not sealed. Instead, an outlet of the reactor was equipped with a check valve to permit the escape of the gas phase product formed in the reaction. The check valve was set to permit the flow of gas out of the reactor when the pressure in the reactor reached 50 psi. Gas escaping through the check valve was directed by a tube and collected to an inverted graduated cylinder filled with water. Upon heating to 110° C., the rate of hydrogen gas produced (expressed as standard $cm^3$/hr) and the cumulative volume of hydrogen gas produced were measured as a function of time of reaction and were determined on the basis of the amount of water displaced in the graduated cylinder.

Figure 2:
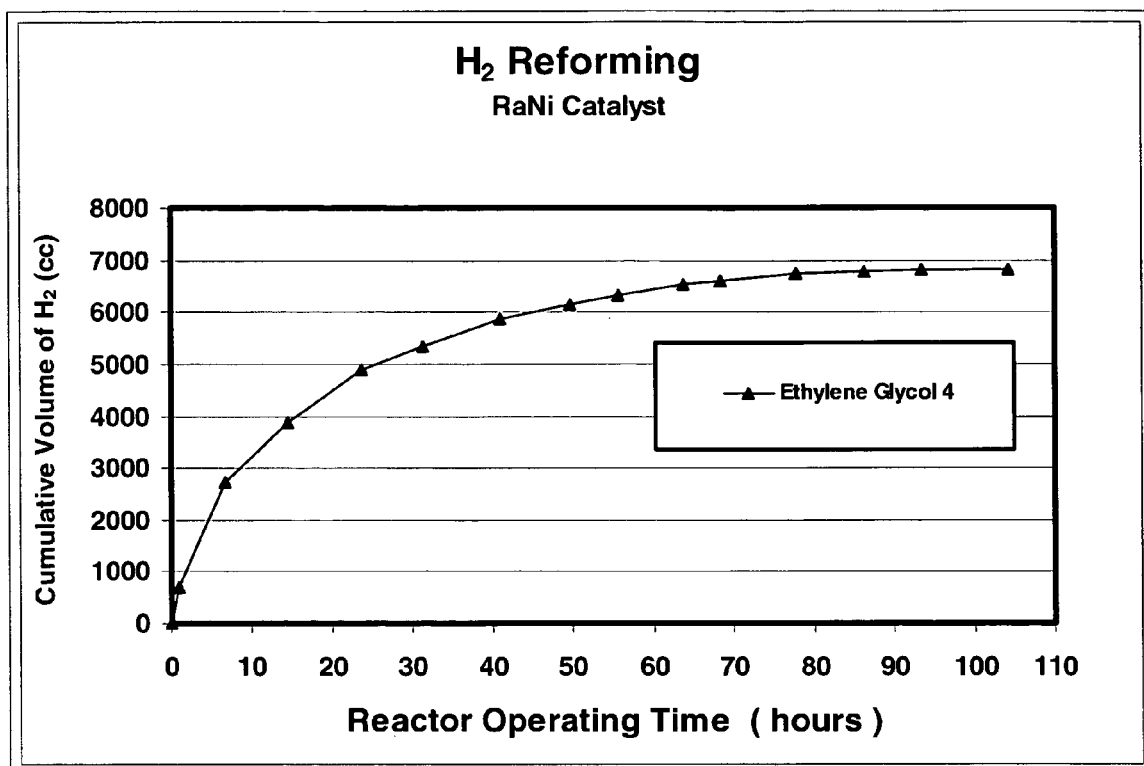
FIG. 2. Cumulative volume (cm$^3$) of hydrogen gas produced from a reaction of ethylene glycol with a base as a function of the time of reaction.

The accumulated volume of hydrogen gas produced as a function of the time of the reaction is shown in FIG. 2 for this experiment. The initial rate of production of hydrogen gas was ~700 $cm^3$/hr and the rate was observed to continuously decrease as the reaction approached completion. Based on the amount of hydrogen produced over the time of the reaction, it was determined that the reaction proceeded essentially to completion during the time period monitored. At the end of this time period, ~6800 standard $cm^3$ of hydrogen gas had been produced. The fact that the reaction reached completion is significant because it shows: (1) the absence of undesirable side reactions that consume ethylene glycol without producing hydrogen; and (2) reaction of all of the ethylene glycol with little or no loss of ethylene glycol through evaporation.

Upon termination of the reaction, the solid phase product that was formed during the reaction was collected and analyzed. X-ray analysis showed the solid phase product to include both sodium carbonate and sodium oxalate. The gas phase product was also analyzed and found to contain essentially pure hydrogen gas.

This experiment shows that ethylene glycol is a suitable starting material for the production of hydrogen in a liquid phase reaction without a need to equip the reactor with a condenser to collect evaporated starting material. This advantage is realized because of the low volatility of ethylene glycol and its sufficient rate of reaction at a temperature well below its boiling point. In contrast to other organic substances, such as ethanol or methanol, that react at acceptable rates to form hydrogen only at temperatures near or above the boiling point, the non-cyclic organic substances having multiple alcohol functionality of the instant invention react efficiently at temperatures at which the substance exhibits low evaporation tendencies. Consequently, the instant invention provides a hydrogen producing reaction that can be achieved in a continuous fashion in a compact reactor, such as a mini- or micro-fuel cell.

The foregoing examples are illustrative of the instant invention. The instant invention generally comprehends reactions of organic substances with a base to produce hydrogen gas where a solid phase byproduct is formed. The preferred organic substances are non-cyclic (e.g. branched or linear) organic substances having two or more alcohol groups per molecule and may also be referred to as organic substances having multiple alcohol functionality. Especially preferred are non-cyclic organic substances having multiple alcohol functionality capable of reacting with a base in a liquid phase reaction at a temperature in which the rate of evaporation of the organic substance is not appreciable. The instant reactions may be completed by contacting the base with the organic substance directly or in the presence of water.

Metal hydroxides are the preferred bases in the instant reactions. Representative metal hydroxides include alkali metal hydroxides (e.g. NaOH, KOH etc.) alkaline earth metal hydroxides (e.g. $Ca(OH)_2$, $Mg(OH)_2$, etc.), transition metal hydroxides, post-transition metal hydroxides and rare earth hydroxides. Non-metal hydroxides such as ammonium hydroxide may also be used. At standard state conditions, most hydroxide compounds are solids. The bases can be introduced in solid, liquid, dissolved, solvated or solution form as reactants in the instant base-facilitated hydrogen-producing reactions. Aqueous solutions are one preferred solution form of hydroxide compounds. A solution comprising an organic substance having multiple alcohol functionality that includes a hydroxide compound in a dissolved or partially dissolved state are another preferred solution form of hydroxide compounds. Suitable metal hydroxide bases include those that are pure or impure as well as those that include adsorbed water or waters of hydration.

In addition to producing hydrogen, the instant reactions may also produce a carbonate, bicarbonate and/or organic salt (salt of an oxidized form of the organic reactant) byproduct. One or more distinct byproducts may be formed. The byproducts may be produced in the form of a precipitate or as wholly or partly soluble salts.

In a further embodiment of the instant invention, the instant base-facilitated reactions are conducted electrochemically to produce hydrogen from an organic substance having multiple alcohol functionality. As described in the '419 patent, inclusion of a base in a hydrogen-producing reaction reduces the electrochemical potential (voltage) required to effect the production of hydrogen from substances relative to the corresponding electrochemical reaction in the absence of a base. The instant invention further includes electrochemical reactions in accordance with the '419 patent as applied to the production of hydrogen from organic substances having multiple alcohol functionality. In these embodiments, an organic substance and base can be combined to form an aqueous or other electrolytic solution and placed in an electrochemical cell having an anode and a cathode. A voltage is applied between the anode and cathode to effect the electrolytic production of hydrogen from the organic substance in the presence of the base in an electrochemical reaction in accordance with the '419 patent. In a representative embodiment, the organic substance is dissolved in an electrolyte, such as an aqueous electrolyte, which is combined with a solid, liquid or dissolved base in an electrochemical cell to form an electrochemical system. An anode and cathode are placed into contact with the electrochemical system and the electrochemical reaction is performed by applying a voltage or passing a current between the anode and cathode to produce hydrogen.

In yet another embodiment of the instant invention, the instant base-facilitated reactions are conducted in combination with the carbonate or bicarbonate recovery reactions discussed in the co-pending parent '093 application. The carbonate or bicarbonate recovery reactions are intended to improve the overall efficiency of the hydrogen-producing reactions that form carbonate or bicarbonate byproducts. Carbonate and bicarbonate compounds are byproducts that need to be sold as a commodity, utilized, discarded or otherwise dispensed with. In order to improve the efficiency of hydrogen production, it is desirable to recycle or otherwise utilize the carbonate or bicarbonate compound byproduct.

The '093 application discusses recovery reactions that may be used to recycle carbonate or bicarbonate byproducts. Various reactions are discussed depending on the form of the carbonate or bicarbonate byproduct formed in the instant base-facilitated reaction. As an example, if a carbonate byproduct is formed as a metal carbonate precipitate, this precipitate can be collected and thermally decomposed to obtain a metal oxide. This metal oxide can subsequently be reacted with water to form a metal hydroxide that can be returned as a base reactant to the instant base-facilitated reaction or reacted with, for example, $Ca(OH)_2$ to obtain NaOH and $CaCO_3$. As another example, if a carbonate by-product is formed as a metal carbonate that is soluble in the reaction mixture, further reaction with a metal hydroxide may occur where the metal hydroxide is selected so that the carbonate salt of its metal has a low solubility (low $K_{sp}$) so that a metathesis reaction occurs to precipitate out a metal carbonate while leaving behind a soluble metal hydroxide that can be used as a base reactant in further runs of the instant base-facilitated reactions. Bicarbonate byproducts may be similarly re-utilized. The method of producing hydrogen gas through the instant base-facilitated reformation reactions may thus optionally include additional steps directed at the recycling, conversion or re-utilization of carbonate or bicarbonate byproducts in accordance with the '093 application.

The hydrogen production reactions of the instant invention may also be conducted in the presence of catalysts such as carbon, carbon black, graphite, transition metals or transition metal complexes. Heterogeneous and homogeneous catalysts are within the scope of the instant invention.

The foregoing discussion and description are not meant to be limitations upon the practice of the present invention, but rather illustrative thereof. It is to be appreciated by persons of skill in the art that numerous equivalents of the illustrative embodiments disclosed herein exist. It is the following claims, including all equivalents and obvious variations thereof, in combination with the foregoing disclosure which define the scope of the invention.

We claim:

1. A process for producing hydrogen gas comprising the step of reacting a non-cyclic organic substance having multiple alcohol functionality with a base and optionally water to form said hydrogen gas along with a carbonate and/or a bicarbonate by-product.

2. The process of claim 1, wherein said organic substance is a diol.

3. The process of claim 2, wherein said organic substance is ethylene glycol.

4. The process of claim 1, wherein said organic substance is a triol.

5. The process of claim 4, wherein said organic substance is glycerol.

6. The process of claim 1, wherein said reaction between said organic substance and said base occurs in the liquid phase.

7. The process of claim 1, wherein said reaction between said organic substance and said base occurs between a vapor phase organic substance and a solid phase base.

8. The process of claim 1, wherein said organic substance and said base are reacted in the presence of water.

9. The process of claim 1, wherein said reaction step further forms a salt of an organic acid.

10. The process of claim 1, wherein said base is a metal hydroxide compound.

11. The process of claim 10, wherein said metal hydroxide compound is an alkaline earth metal hydroxide compound.

12. The process of claim 1, wherein said reaction step occurs at a temperature below the boiling temperature of said organic substance.

13. The process of claim 1, where said reaction step further forms a salt of an oxidized form of said organic substance.

14. The process of claim 13, wherein said salt is the salt of an organic acid.

15. The process of claim 1, further including the step of reacting said carbonate or bicarbonate with a metal hydroxide compound.

16. The process of claim 1, further including the step of thermally decomposing said carbonate or bicarbonate, said thermal decomposition step producing a metal oxide.

17. The process of claim 1, wherein said reaction step includes an electrochemical reaction, said electrochemical reaction occurring in an electrochemical cell into which said organic substance, said base and an electrolyte are placed to form an electrochemical reaction system, said electrochemical cell including an anode and cathode in contact with said electrochemical system, said electrochemical reaction being initiated upon applying a voltage between said anode and said cathode.

18. The process of claim 1, wherein the Gibbs free energy of the reaction between the hydrocarbon and the base at 25 degrees Celsius and 1 atmosphere pressure is negative.

19. The process of claim 1, wherein hydrogen gas is substantially the only gas phase substance formed by said reaction between said base and said non-cyclic organic substance having multiple alcohol functionality.

20. A process for producing hydrogen gas comprising the step of reacting a non-cyclic organic substance having multiple alcohol functionality with a base and optionally water to form said hydrogen gas without any substantial production of carbon dioxide or carbon monoxide.

21. The process of claim 20, wherein said hydrogen is the only gaseous product of said step of reacting.

* * * * *